(12) United States Patent
Lee

(10) Patent No.: US 11,454,018 B2
(45) Date of Patent: Sep. 27, 2022

(54) SAFETY ENCLOSURE FOR BUILDING STRUCTURES

(71) Applicant: Sean S. Lee, San Bernardino, CA (US)

(72) Inventor: Sean S. Lee, San Bernardino, CA (US)

( * ) Notice: Subject to any disclaimer, the term of this patent is extended or adjusted under 35 U.S.C. 154(b) by 0 days.

(21) Appl. No.: 17/166,933

(22) Filed: Feb. 3, 2021

(65) Prior Publication Data
US 2021/0381221 A1 Dec. 9, 2021

Related U.S. Application Data

(63) Continuation-in-part of application No. 29/746,090, filed on Aug. 11, 2020.

(60) Provisional application No. 63/035,558, filed on Jun. 5, 2020.

(51) Int. Cl.
*E04B 1/32* (2006.01)
*A62C 35/68* (2006.01)
*E04B 9/00* (2006.01)
*H02S 20/23* (2014.01)

(52) U.S. Cl.
CPC ............ *E04B 1/3211* (2013.01); *A62C 35/68* (2013.01); *E04B 1/3205* (2013.01); *E04B 9/006* (2013.01); *H02S 20/23* (2014.12); *E04F 2290/02* (2013.01)

(58) Field of Classification Search
CPC ...... E04B 1/3211; E04B 1/3205; E04B 9/006; H02S 20/23; A62C 35/68; E04F 2290/02
USPC .............. 52/6, 23, DIG. 14, 80.1, 80.2, 81.1
See application file for complete search history.

(56) References Cited

U.S. PATENT DOCUMENTS

| | | | | |
|---|---|---|---|---|
| 2,910,737 A | * | 11/1959 | MacMillan | A63H 33/107 52/81.1 |
| 3,284,969 A | * | 11/1966 | Walters | E04B 1/3211 52/81.4 |
| 3,802,390 A | * | 4/1974 | Blair | A01K 1/0041 119/450 |
| 3,872,634 A | * | 3/1975 | Seaman | E04H 15/18 52/222 |
| 3,924,363 A | * | 12/1975 | Candle | E04H 15/22 52/2.19 |
| 4,155,967 A | * | 5/1979 | South | E04B 1/169 264/32 |
| 4,297,814 A | * | 11/1981 | Tomassetti, Jr. | E04B 1/3211 52/81.4 |

(Continued)

*Primary Examiner* — Brian E Glessner
*Assistant Examiner* — Adam G Barlow

(57) ABSTRACT

A safety enclosure for building structures is an apparatus that provides maintains a safe and healthy living environment and shields hazardous conditions from a surrounding environment. The apparatus includes a structure enclosure, at least one entrance, a plurality of anchoring posts, a plurality of indoor environmental systems, a plurality of indoor maintenance systems, a main controller unit, and a power supply. The structure enclosure surrounds a building and any supplemental buildings. The building may include a variety of extensions as well. The at least one entrance provides access into and out of the structure enclosure. The plurality of anchoring posts secures the structure enclosure with the ground. The plurality of indoor environmental systems ensures livable conditions within the structure enclosure. The plurality of indoor environmental systems ensures the safety within the structure enclosure. The main controller provides a user with manual operation and the power supply provides the necessary power.

18 Claims, 13 Drawing Sheets

(56) References Cited

U.S. PATENT DOCUMENTS

| | | | | |
|---|---|---|---|---|
| 4,324,074 | A * | 4/1982 | South | E04B 1/3505 52/2.15 |
| 4,567,696 | A * | 2/1986 | Malet | E04H 15/22 52/2.24 |
| 5,341,610 | A * | 8/1994 | Moss | E04B 1/3211 52/199 |
| 5,918,438 | A * | 7/1999 | South | E04B 1/3211 52/745.07 |
| 6,840,013 | B2 * | 1/2005 | South | E04B 1/169 52/2.15 |
| 7,992,348 | B2 * | 8/2011 | Fritzel | G01R 29/0821 52/2.11 |
| 8,371,073 | B2 * | 2/2013 | Fuller | E04F 17/00 52/80.1 |
| 2005/0210767 | A1 * | 9/2005 | DeFever | E04B 1/169 52/80.1 |
| 2007/0151170 | A1 * | 7/2007 | Carter | E04B 1/3211 52/81.1 |
| 2009/0025306 | A1 * | 1/2009 | Reed | E04H 9/14 52/80.1 |
| 2009/0217930 | A1 * | 9/2009 | Holley | A61G 10/026 128/205.26 |
| 2015/0041078 | A1 * | 2/2015 | Perache | A47H 1/04 160/331 |
| 2015/0156031 | A1 * | 6/2015 | Fadell | G08B 19/005 700/276 |
| 2020/0299951 | A1 * | 9/2020 | Drew | E04H 9/10 |

* cited by examiner

SAFETY ENCLOSURE FOR BUILDING STRUCTURES

The current application claims a priority to the U.S. provisional patent application Ser. No. 63/035,558 filed on Jun. 5, 2020.

The current application is also a continuation-in-part (CIP) application of the U.S. design application Ser. No. 29/746,090 filed on Aug. 11, 2020.

FIELD OF THE INVENTION

The present invention generally relates to safety system. More specifically, the present invention is a safety enclosure for a healthy and safe living environment for individuals and other animals or living things within and around building structures.

BACKGROUND OF THE INVENTION

With increasing threats to an individual's health from contagious diseases or dangerous environmental and weather conditions, there is less refuge to environments with safe and healthy spaces. Such dangerous environmental conditions may include severe air pollution. Such weather conditions may include hurricanes, extended snowstorms, and heat waves. The increased population makes isolation and quarantine life much more difficult to maintain. Furthermore, it is equally difficult to maintain a livable environment that is contained.

It is therefore an objective of the present invention to provide a safe, contained living environment that prevents any hazardous conditions from a surrounding environment from contaminating the safe and contained environment. The present invention constantly maintains good air quality within the enclosed building structure. Additionally, the present invention is free from odor, chemically inactive, and harmless to the environment. A fire within the present invention is directly managed and stopped by the safety systems of the present invention. The present invention protects against environmental hazardous elements and is environment friendly. The present invention provides privacy and allows a user to enjoy the surrounding environment. Most importantly, the present invention prolongs the life of a user and maintains a healthy life for a user compared to conventional buildings.

DETAIL DESCRIPTIONS OF THE INVENTION

All illustrations of the drawings are for the purpose of describing selected versions of the present invention and are not intended to limit the scope of the present invention.

Figure 1:
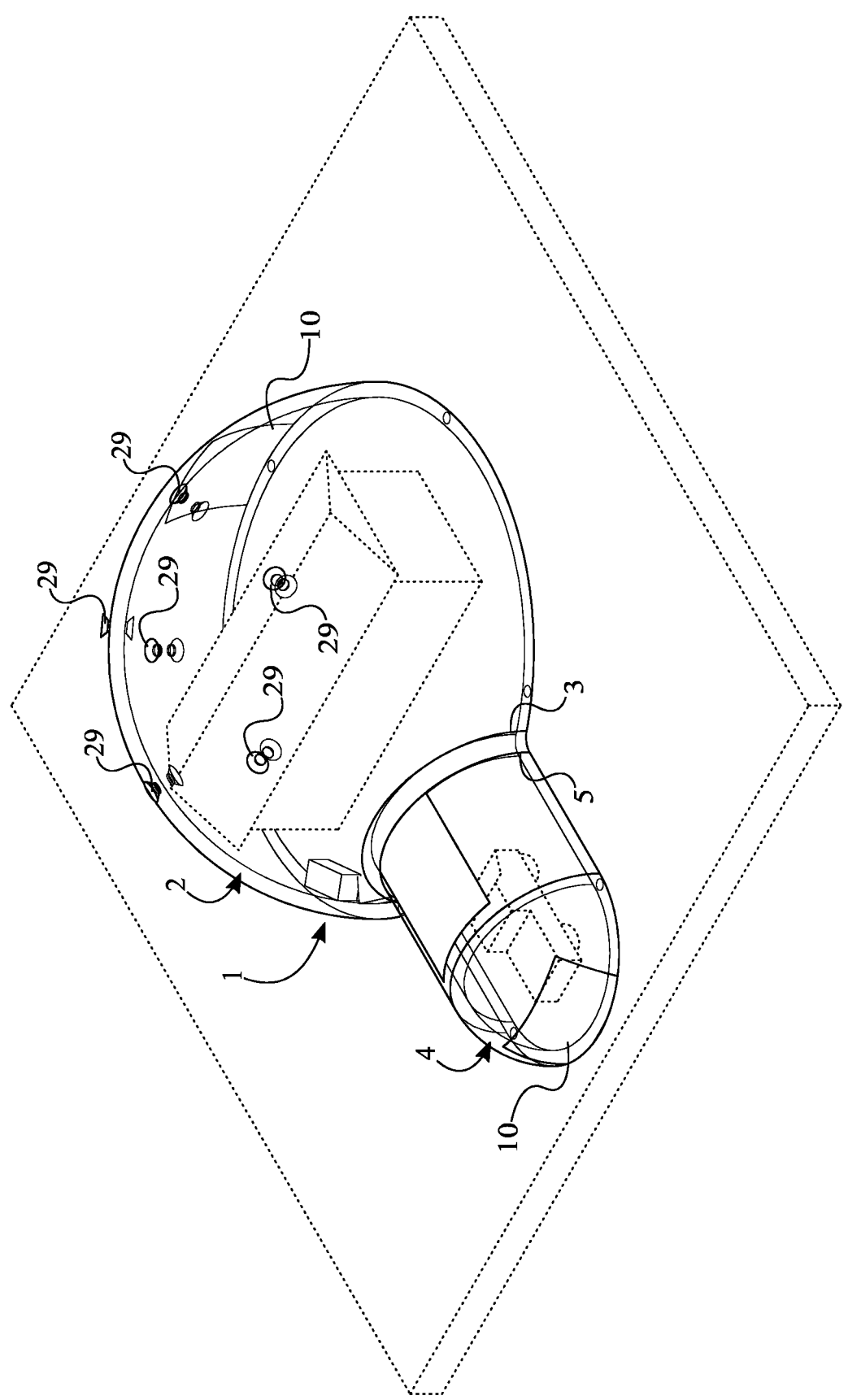
FIG. 1 is a top perspective view of the present invention anchored into the ground.
Figure 7:
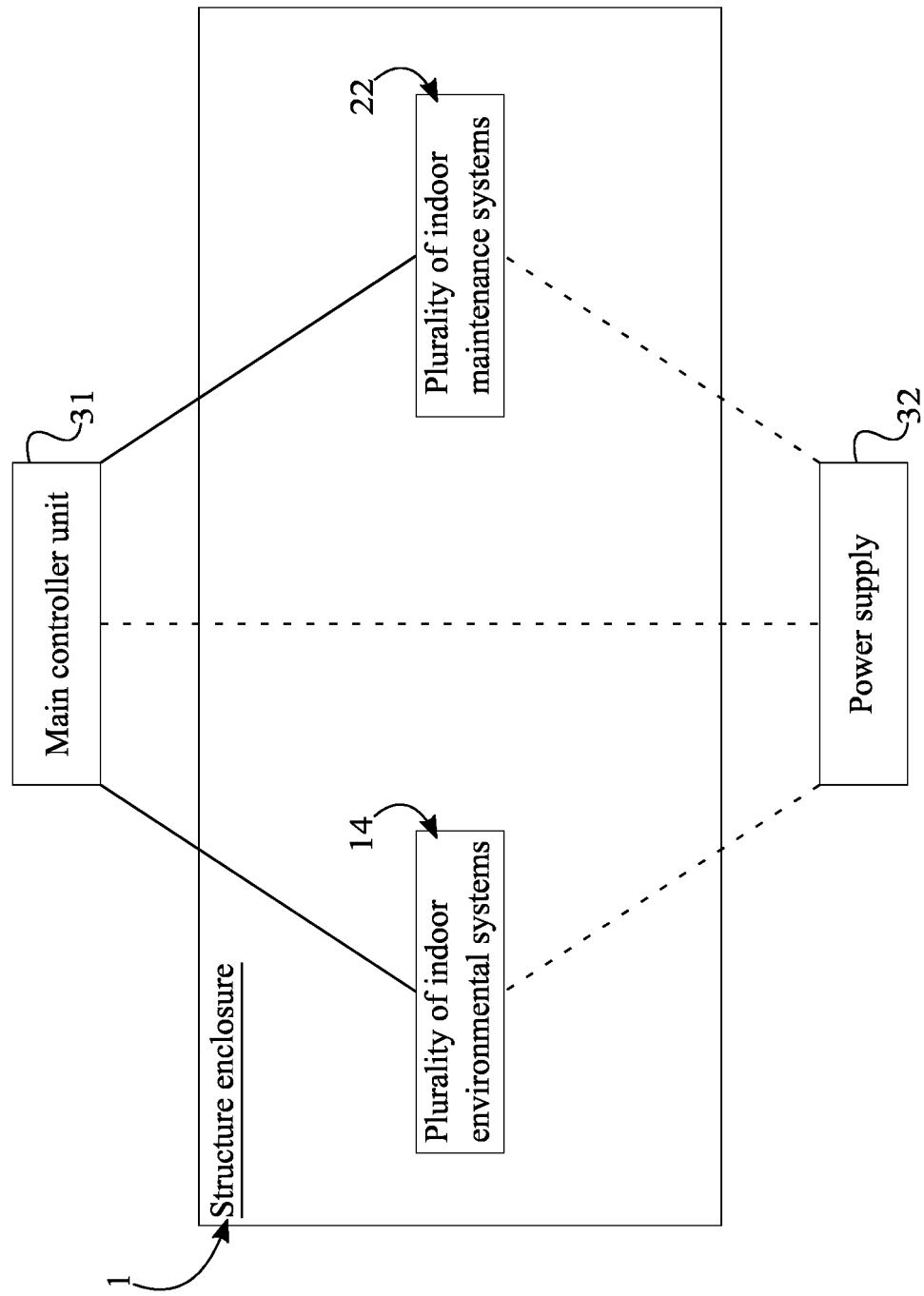
FIG. 7 is a schematic view of the electric and electronic connections of the present invention.

The present invention is a safety enclosure for building structures. The present invention provides an enclosed building structure. The present invention is a protective complex that encloses a building that may be residential, commercial, etc. The present invention is preferably designed for residential buildings and provides numerous advantages such as security and privacy to the premises, noise buffering, clearance from pollution, rain, wind, and Ultraviolet (UV) light environmental radiation proof. The present invention provides safety from harmful environmental microorganisms including virus, bacteria and fungus. The present invention facilities easy living with convenient access to the yard and other amenities, the ability to change orientation to accommodate the geographic and physical contours of the area. The present invention, however, still maintains a small environmental footprint. The present invention is completely sealed and self-contained. A preferred embodiment of the present invention comprises a structure enclosure 1, at least one entrance 10, a plurality of anchoring posts 11, a plurality of indoor environmental systems 14, a plurality of indoor maintenance systems 22, a main controller unit 31, and a power supply 32, seen in FIG. 1 and FIG. 7. The structure enclosure 1 shields a building and a defined area around the building. As the structure enclosure 1 shields the building from any weather damage, the building may be light and contemporary. In the preferred embodiment of the present invention the structure enclosure 1 is dome-shaped, thereby reducing any resistance due to wind and hurricanes. Moreover, there are no sharp corners that increase friction and resistance against the conditions of the surrounding environment. The structure enclosure 1 is preferably 10 millimeters (mm) thick and is made from rigid, molded transparent acrylic material. In order to contain the defined area while maintaining an aesthetically pleasing living environment, the structure enclosure 1 may comprise a main dome portion 2, at least one corridor portion 4, and a base cutout rim 9. The main dome portion 2 surrounds the main building, and the at least one corridor portion 4 surrounds any supplemental structures such as a garage or extensions of the main building. The base cutout rim 9 presses against the ground and minimizes any contamination from the surrounding environment. The at least one entrance 10 is a pathway into and out of the structure. The at least one entrance 10 provides access to the building and the defined area around the building. The at least one entrance 10 may be, but is not limited to, a door, a garage door, an emergency exit, and a service entrance. In alternate embodiments of the present invention, if the at least one corridor portion 4 serves a passageway into the main dome portion 2, the at least one corridor portion 4 comprises a ventilation mechanism and a sanitization mechanism that is integrated into the at least one corridor portion 4. The ventilation mechanism and the sanitation mechanism prevent any unhealthy and unsafe contaminants from entering into the main dome portion 2. Once the at least one corridor portion does not detect any unhealthy or unsafe contaminants, the at least one corridor portion 4 permits the entry of the vehicle or individual into the main dome portion 2.

Figure 2:
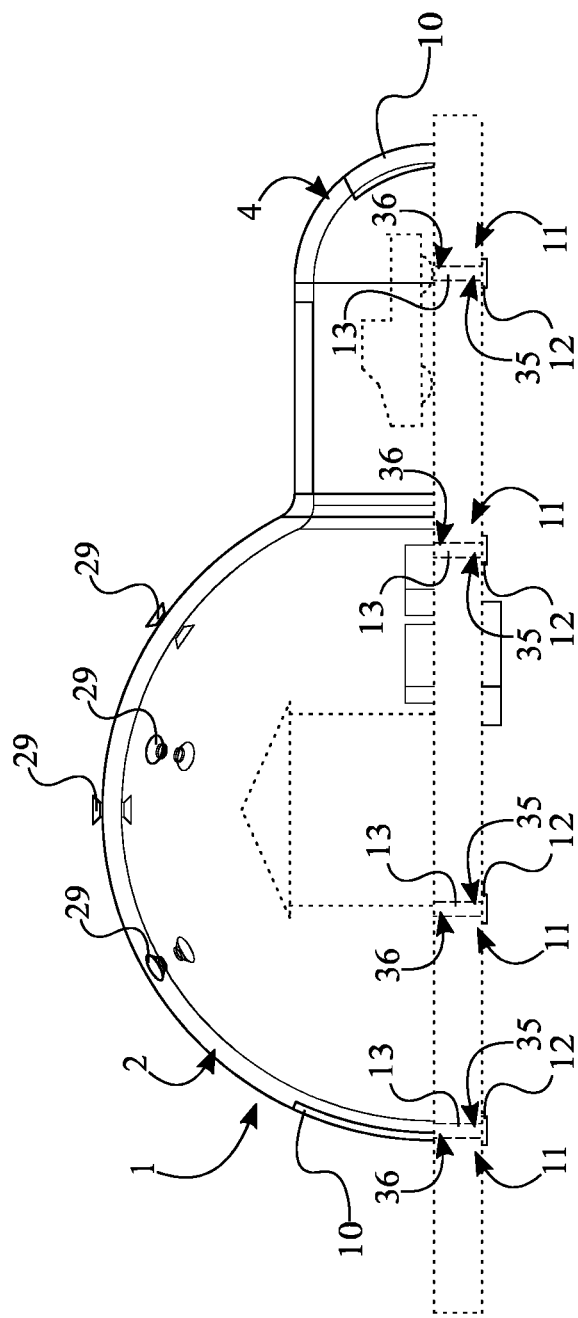
FIG. 2 is a side view of the present invention anchored into the ground.
Figure 3:
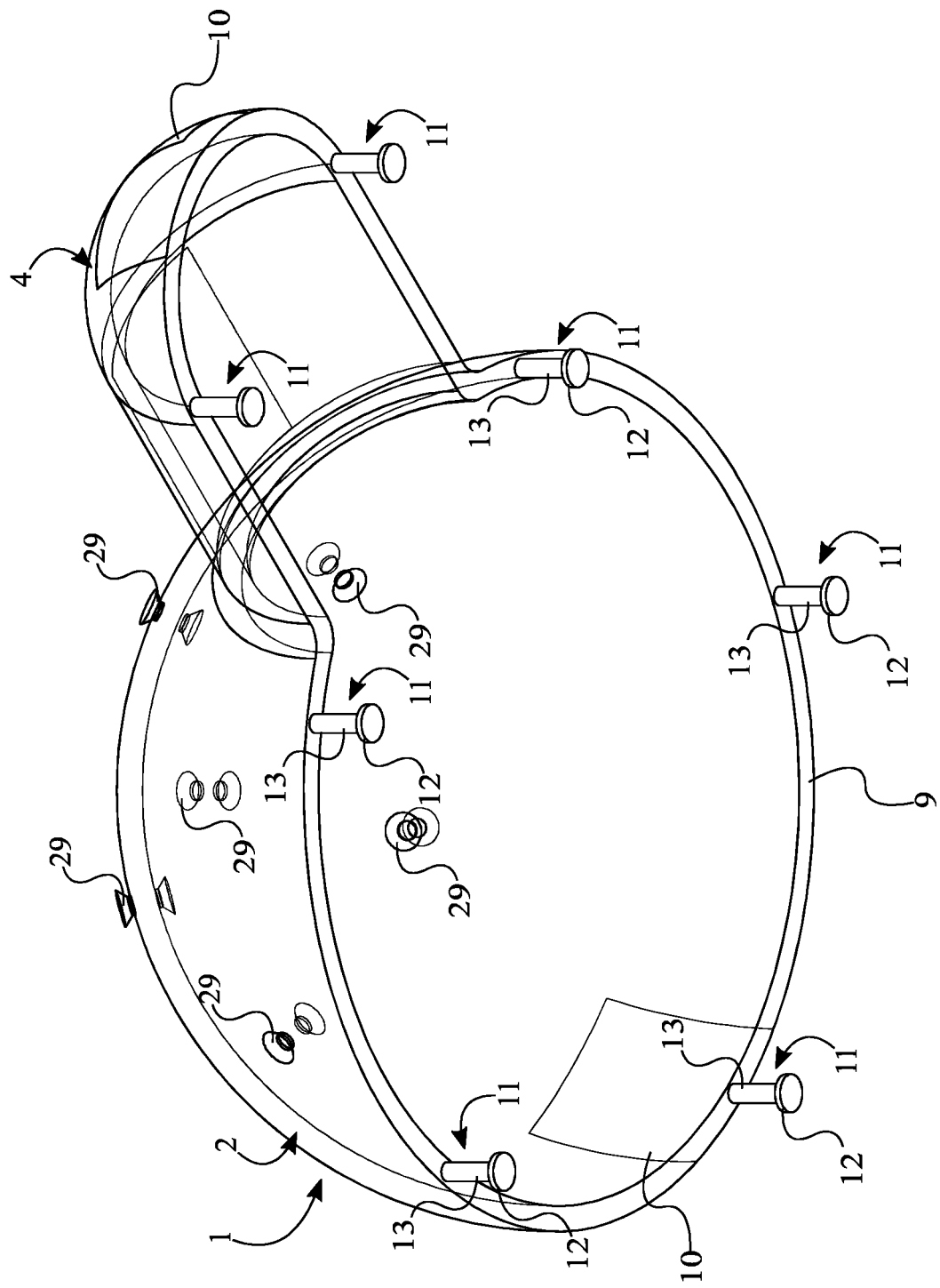
FIG. 3 is a bottom perspective view of the present invention.
Figure 4:
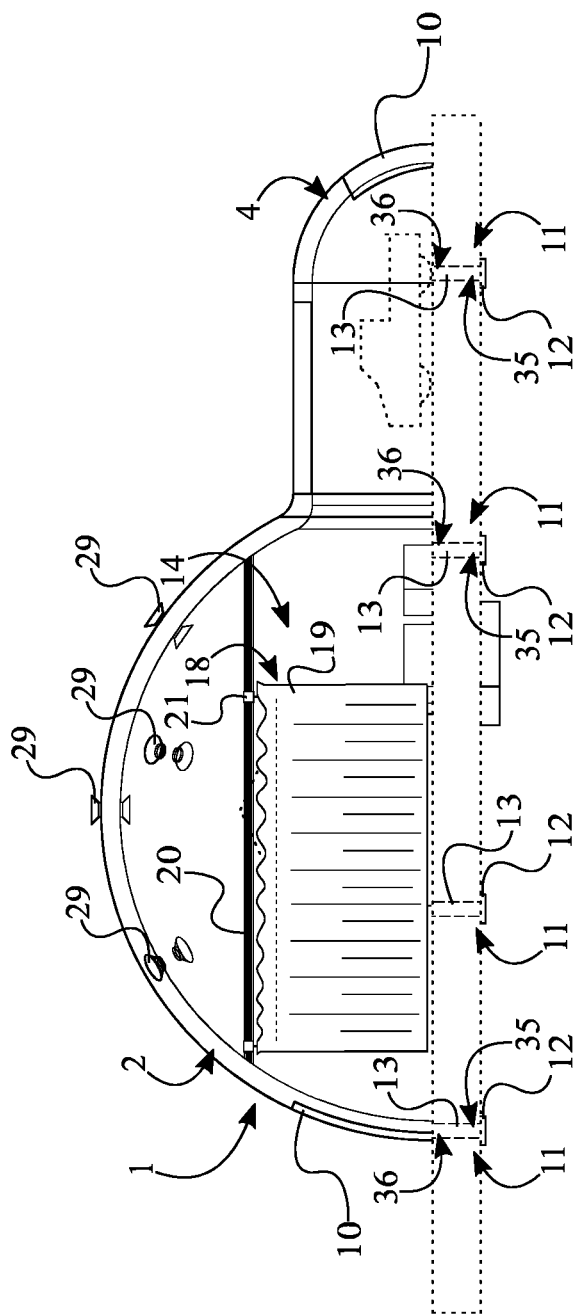
FIG. 4 is a side view of the present invention with a shade system.
Figure 5:
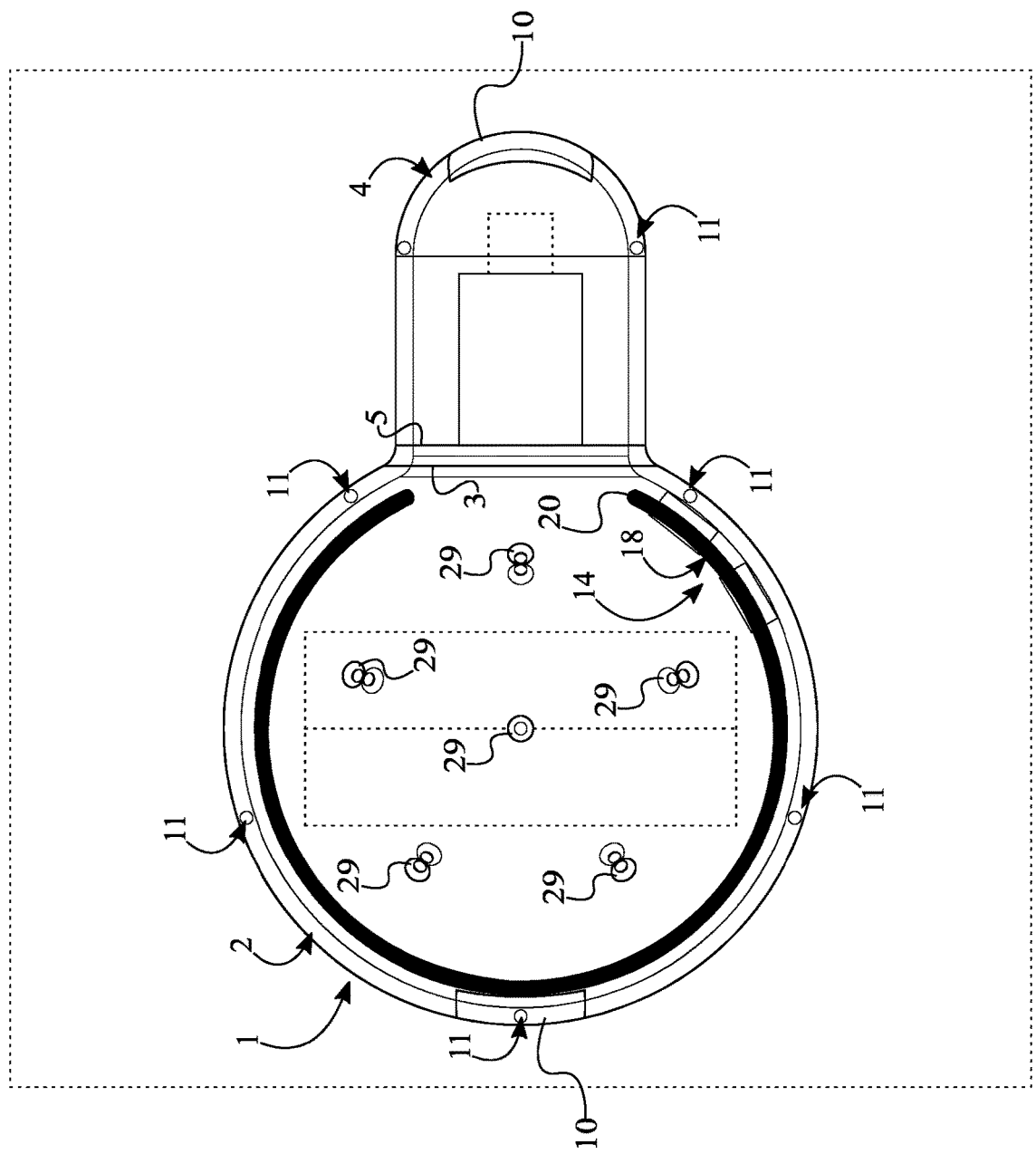
FIG. 5 is a top side view of the present invention with the shade system.

The plurality of anchoring posts 11 securely mounts the structure enclosure 1 into the ground, as seen in FIG. 2, FIG. 3, and FIG. 4. The plurality of indoor environmental systems 14 and the plurality of indoor maintenance systems 22 preserve a safe, healthy, and livable interior environment within the structure enclosure 1. The main controller unit 31 provides a user with manual control over the plurality of indoor environmental systems 14, the plurality of indoor maintenance systems 22, and the power supply 32. It is understood that the main controller unit 31 may operate and control any compatible system of the building within the structure enclosure 1 as well. The power supply 32 provides the necessary power for preferably the plurality of indoor environmental systems 14, the plurality of indoor maintenance systems 22, and the main controller unit 31. The power supply 32 may further provide the necessary power for the structure enclosure 1 as well.

The general configuration of the aforementioned components allows the present invention to effectively and efficiently define a border around a building structure that enhances and maintains a healthy quality of life. In order for the user and other individuals to freely move within the building and the defined area around the building, the at least one corridor portion 4 is positioned adjacent with the main dome portion 2, seen in FIG. 1, FIG. 2, FIG. 3, FIG. 4, and FIG. 5. Any supplemental buildings or extensions of the main building remain protected within the structure enclosure 1 as a lateral cutout rim 5 of the at least one corridor portion 4 is fixed along a lateral cutout rim 3 of the main dome portion 2. The base cutout rim 9 is peripherally positioned about the main dome portion 2 and the at least one corridor portion 4 in order to seal the environment within the structure enclosure 1 with the ground. Moreover, the base cutout rim 9 is peripherally positioned about the main dome portion 2 and the at least one corridor portion 4. The base cutout rim 9 is also positioned perpendicular with the lateral cutout rim 5 of the at least one corridor portion 4 and the lateral cutout rim 3 of the main dome portion 2, thereby maintaining a continuous path into and out of the at least one corridor portion 4 and the main portion while sealing the environment within the structure enclosure 1. In order to enter into and exit out of the structure enclosure 1 from the surrounding environment, the at least one entrance 10 is integrated into the structure enclosure 1. The structural integrity of the structure enclosure 1 is secure as the plurality of anchoring posts 11 is distributed along the base cutout rim 9 and is connected adjacent with the base cutout rim 9. This arrangement allows the structure enclosure 1 to be superimposed across the contours of the ground. The plurality of indoor environmental systems 14 and the plurality of indoor maintenance systems 22 are mounted within the structure enclosure 1, thereby being able to monitor the conditions within the structure enclosure 1 and manage the conditions within the enclosure. In order for the user to manually control the conditions within the structure enclosure 1, the plurality of indoor environmental systems 14 and the plurality of indoor maintenance systems 22 are electronically connected with the main controller unit 31. The plurality of indoor environmental systems 14, the plurality of indoor maintenance systems 22, and the main controller unit 31 are able to operate as the plurality of indoor environmental systems 14, the plurality of indoor maintenance systems 22, and the main controller unit 31 are electrically connected with the power supply 32.

Figure 6:
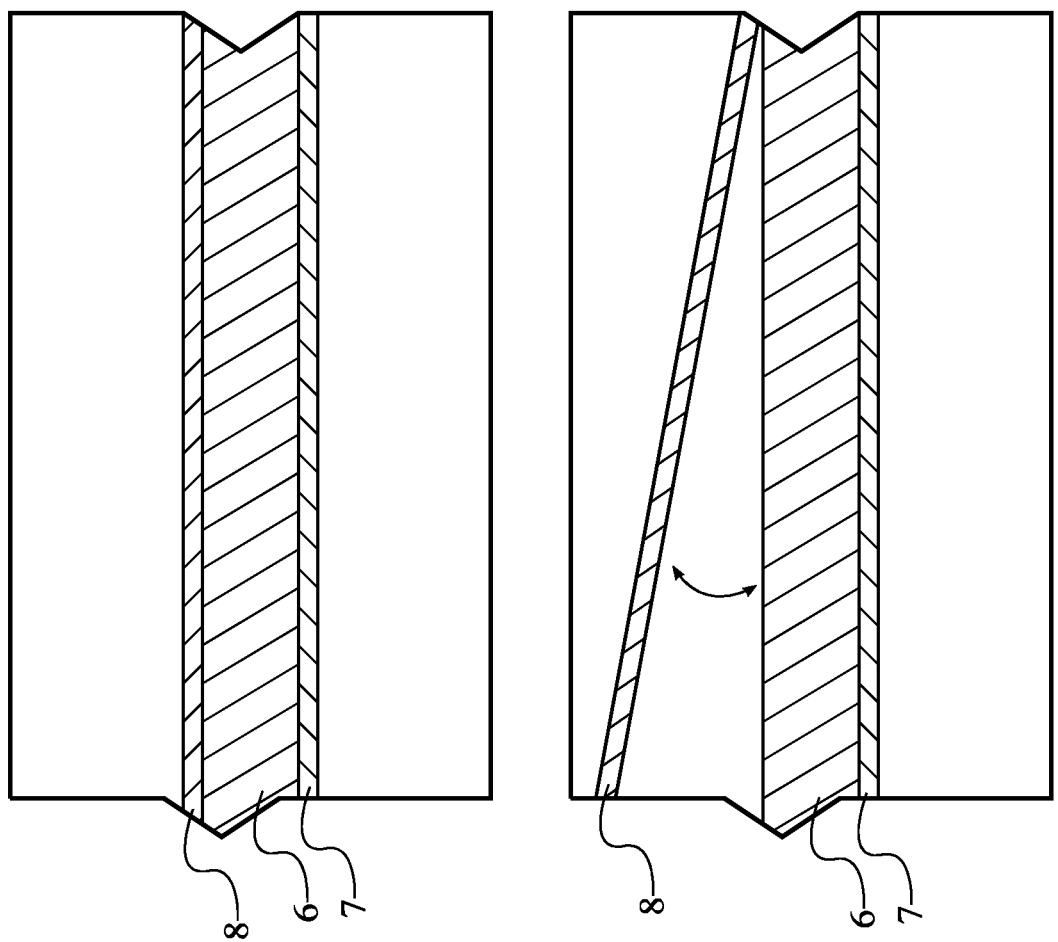
FIG. 6 is a schematic view of a main structural layer, an inner layer, and an outer layer for a main dome portion and at least one corridor portion for a structure enclosure of the present invention.

The main dome portion 2 and the at least one corridor portion 4 may each comprise a main structural layer 6, an inner layer 7, and an outer layer 8, seen in FIG. 6. The main structural layer 6 defines the shape and contour of the main dome portion 2 and the at least one corridor portion 4, respectively. Furthermore, the main structural layer 6 serves as the main dome portion 2 and the at least one corridor portion 4 in order to provide a safe living space underneath the structural enclosure. The inner layer 7 further seals the main layer to better maintain the environment within the structural enclosure. The outer layer 8 protects the main structural layer 6 from direct damage from the surrounding environment. In the preferred embodiment of the present invention, the main structural layer 6, the inner layer 7, and the outer layer 8 are transparent so that the user may still be able to enjoy the surrounding environment without being at risk of the hazards of the surrounding environment. More specifically, the outer layer 8 is made of an ultraviolet protective material with an anti-reflective feature, furthering the safety of the environment within the structural enclosure. In order to ensure the safety of the area underneath the structure enclosure 1, the main structural layer 6 is superimposed across the inner layer 7, and the outer layer 8 is superimposed across the main structural layer 6, opposite the inner layer 7. The structure enclosure 1 is defined as the inner layer 7 is fixed with the main structural layer 6. The outer layer 8 is removably attached with the main structural layer 6 in order to facilitate the replacement of the outer layer 8 as a result of any damage or other external factors.

The plurality of anchoring posts 11 supports the weight of the structure enclosure 1 while being mounted into the ground as each of the plurality of anchoring posts 11 may comprise a base plate 12 and a height-adjustable rod 13, also seen in FIG. 2, FIG. 3, and FIG. 4. The base plate 12 provides a mountable surface for the height-adjustable rod 13 to press against the ground. It is understood that additional fasteners may be utilized to anchor the base plate 12 into the ground. The height-adjustable rod 13 offsets a portion of the base cutout rim 9 with the ground depending on the contour of the ground and the terrain. The height-adjustable rod 13 may comprise a first rod end 35 and a second rod end 36. The first rod end 35 is positioned opposite the second rod end 36 about the height-adjustable rod 13. The structure enclosure 1 is oriented upright with respect to the ground as the height-adjustable rod 13 is positioned normal to the base plate 12. More specifically, the first rod end 35 is fixed onto the base plate 12, and the second rod is mounted into the base cutout rim 9. Similar with the base plate 12, additional fasteners may be utilized to secure the second rod end 36 into or with the base cutout rim 9.

Figure 8:
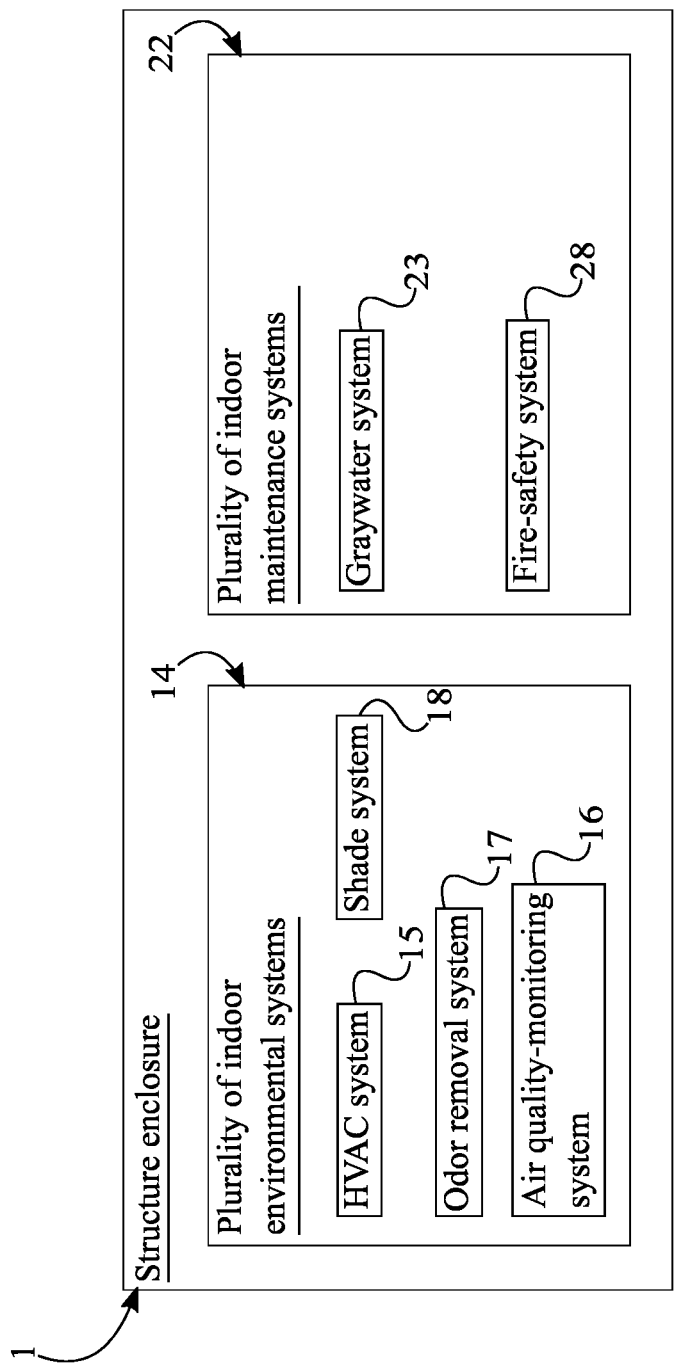
FIG. 8 is a schematic view of a plurality of indoor environmental systems and a plurality of indoor maintenance systems of the present invention.
Figure 9:
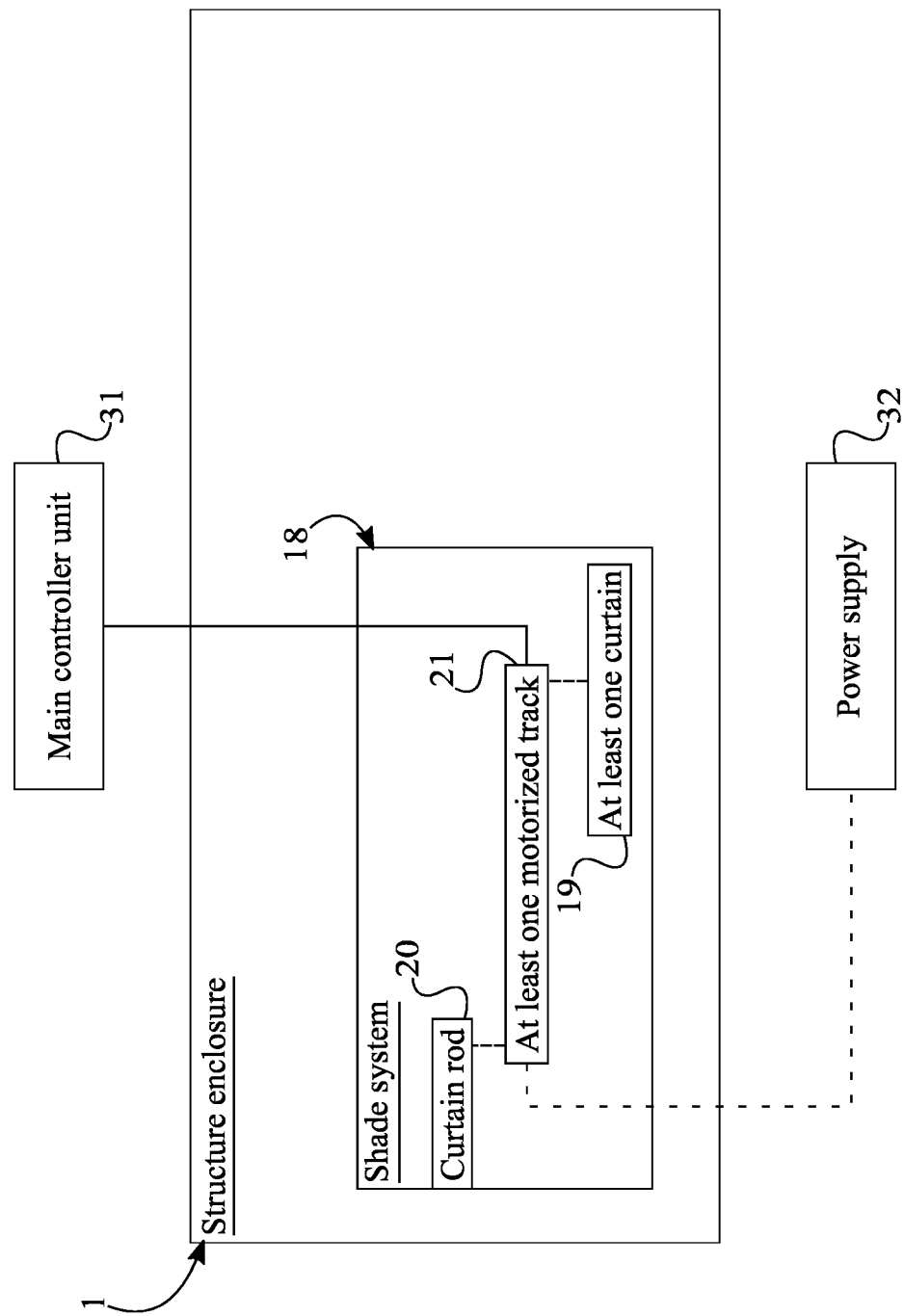
FIG. 9 is a schematic view of the electric and electronic connections for the shade system of the present invention.

The plurality of indoor environmental systems 14 may comprise a heating, ventilation, and air conditioning (HVAC) system 15, an air quality-monitoring system 16, and an odor removal system 17, seen in FIG. 8. The HVAC system 15 manages the temperature within the structure enclosure 1 and ventilates the air within the structure enclosure 1. The air quality-monitoring system 16 manages the percentage of natural air gases in order to maintain clean air within the structure enclosure 1. Moreover, the air quality-monitoring system 16 preferably adjusts the gasses of the air to maintain 78% nitrogen gas, 21% oxygen, and negligible percentage of other gasses. The odor removal system 17 treats and removes odors within the structure enclosure 1. In order to maintain a desired temperature and replenish the environment within the structure enclosure 1, the HVAC system 15 is operatively integrated through the structure enclosure 1, wherein the HVAC system 15 is used to manage an internal climate of the structure enclosure 1. Similarly, the odor removal system 17 is operatively integrated through the structure enclosure 1, wherein the odor removal system 17 is used to filter an unwanted odor out of the structure enclosure 1, thereby automatically removing any odors detected within the enclosure. In the event of any harmful gasses leaking within the structure enclosure 1, the air quality-monitoring system 16 is operatively mounted within the structure enclosure 1, wherein the air quality-monitor system 16 is used to test and warn a breathability quality of air within the structure enclosure 1.

In order to provide privacy within the structure enclosure 1, the plurality of indoor environmental systems 14 may comprise a shade system 18, seen in FIG. 4, FIG. 5, FIG. 8, and FIG. 9. The shade system 18 conceals the environment within the structure enclosure 1. In order to be able to provide privacy within the structure enclosure 1 and to expose the environment within the structure enclosure 1 according to the preference of the user, the shade system 18 may comprise at least one curtain 19, a curtain rod 20, and a motorized track 21. The at least one curtain 19 shield a portion, if not all, of the environment within the structure enclosure 1. The curtain rod 20 suspends the at least one curtain 19 within the structure enclosure 1. The motorized track 21 automatically extends and retracts the at least one curtain 19 across the curtain rod 20. In order to protect the shade system 18 from the conditions of the surrounding environment, the shade system 18 is positioned within the structure enclosure 1. The shade system 18 provides complete or partial privacy within the structure enclosure 1, the curtain rod 20 is mounted about the structure enclosure 1 and is positioned offset from the base cutout rim 9. The motorized track 21 is mounted along the curtain rod 20 in order to control the position of the at least one curtain 19 along the curtain rod 20. The at least one curtain 19 is operatively coupled along the curtain rod 20 by the motorized track 21, wherein the motorized track 21 is used to move the at least one curtain 19 along the curtain rod 20. This engagement allows the at least one curtain 19 to be managed by the user without the user having to manually adjust the at least one curtain 19. More specifically, the motorized track 21 is electronically connected with the main controller unit 31 and is electrically connected with the power supply 32. The motorized track 21 is therefore remotely controlled and harnesses the necessary power from the power supply 32.

Figure 10:
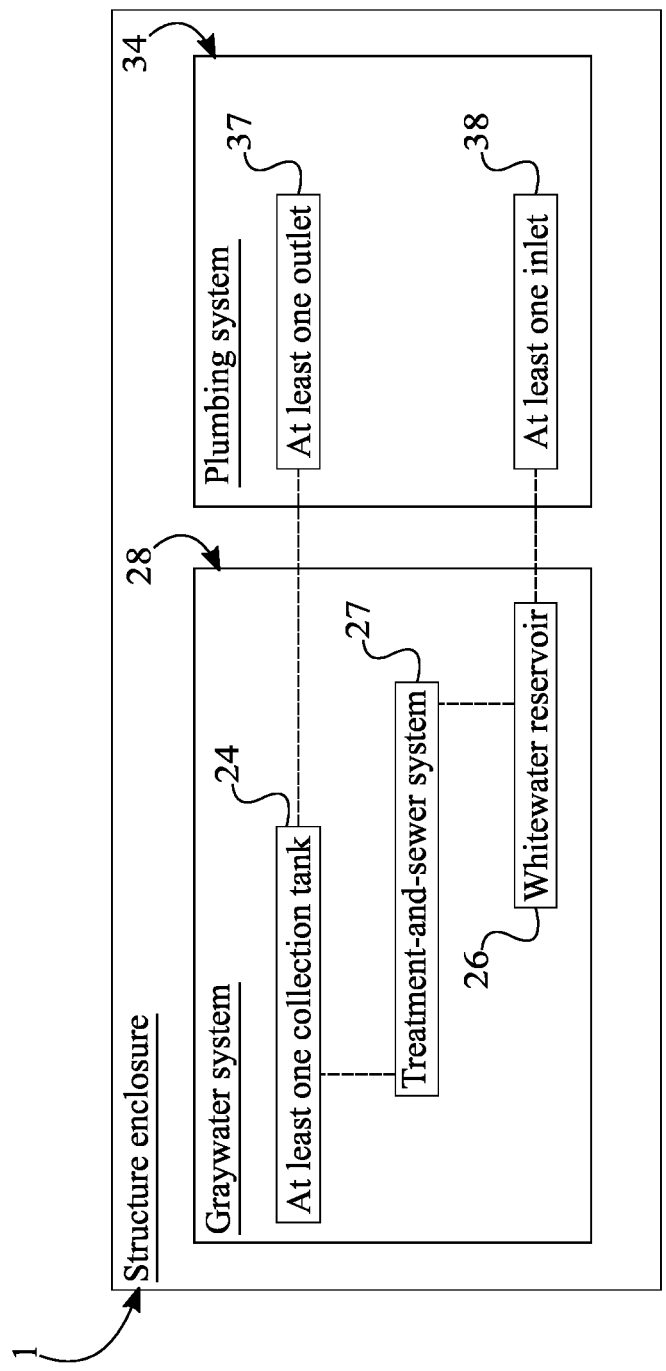
FIG. 10 is a schematic view of the connections for a graywater system and a plumbing system of the present invention.

In order to provide water for use and the removal of waste within the structure enclosure 1, the present invention may further comprise a plumbing system 34, seen in FIG. 10. It is understood that an existing plumbing system of the building within the structure enclosure 1 may be integrated with that of the present invention. The water supply for the living environment within the structure enclosure 1 is quickly replenished as the plurality of indoor maintenance systems 22 may further comprise a graywater system 23, seen in FIG. 8 and FIG. 10. The graywater system 23 collects and treats the used water from the plumbing system 34 supply for reuse. The graywater system 23 may comprise at least one collection tank 24, a whitewater reservoir 26, and a treatment-and-sewer system 27. The at least one collection tank 24 receives the used water from the plumbing system 34. The treatment-and-sewer system 27 treats the water exiting from the at least one collection tank 24 and entering the whitewater reservoir 26. The whitewater reservoir 26 contains the treated water that is ready for reuse. In order to provide water and remove waste for the building within the structure enclosure 1, the plumbing system 34 is operatively integrated through the structure enclosure 1, wherein the plumbing system 34 is used to selectively move water throughout the structure enclosure 1. In order to retrieve used water from the building and provide treated water for reuse, the at least one outlet 37 of the plumbing system 34 is in fluid communication with the at least one collection tank 24. The treated water is preserved as the at least one collection tank 24 is in fluid communication with the whitewater reservoir 26 through the treatment-and-sewer system 27. The treated water is ready for reuse as the whitewater reservoir 26 is in fluid communication with the at least one inlet 38 of the plumbing system 34.

Figure 11:
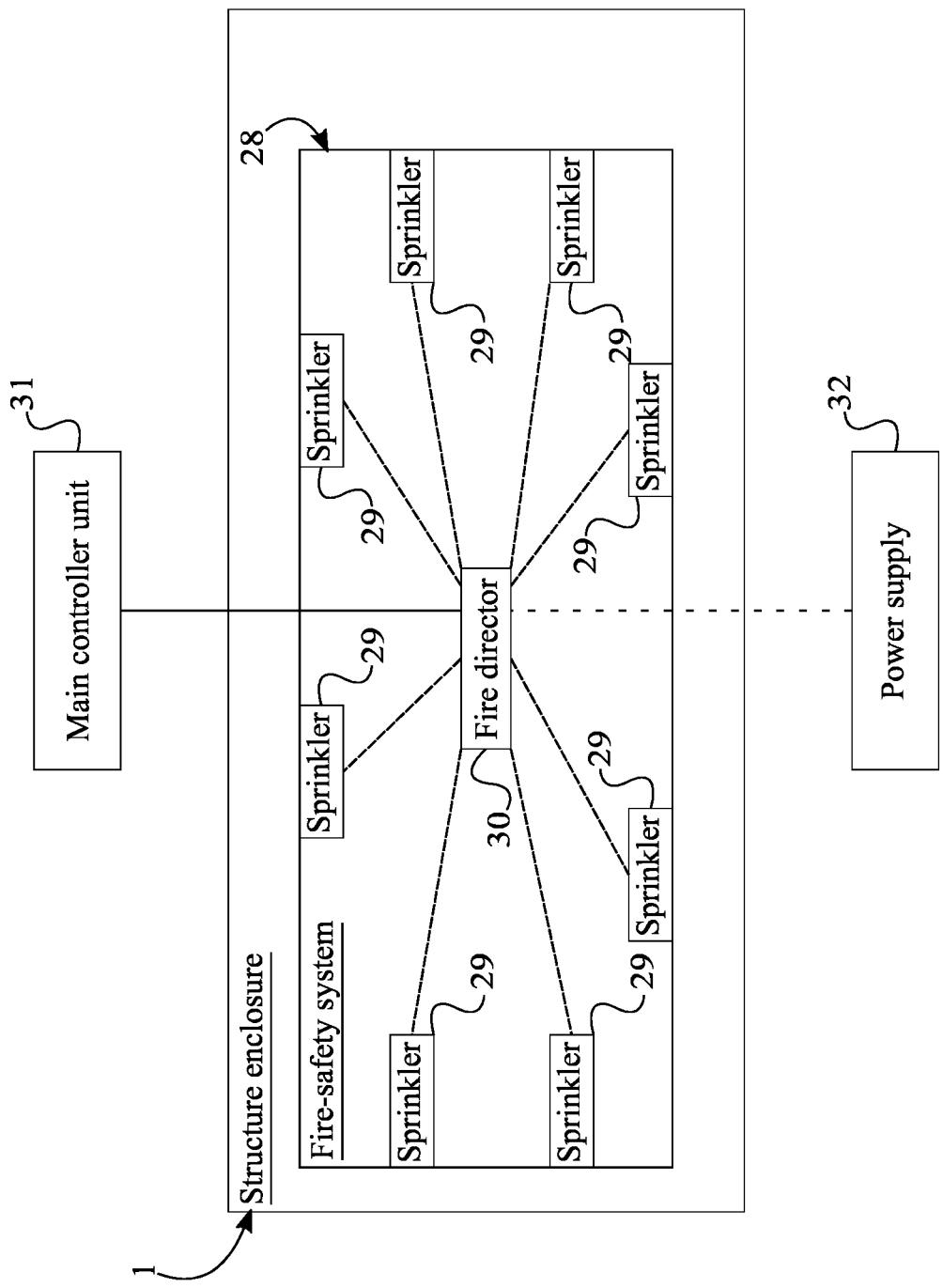
FIG. 11 is a schematic view of the electric and electronic connections for a fire-safety system of the present invention.

As the environment within the structure enclosure 1 is sealed from the surrounding environment, fire fighters and fire trucks may have limited access to manage a fire within the structure enclosure 1. Therefore, in order to provide fire protection for immediate relief of fire within the structure enclosure 1, the plurality of indoor maintenance systems 22 may comprise a fire-safety system 28, seen in FIG. 8 and FIG. 11. In the preferred embodiment of the present invention, the fire-safety system 28 comprises a plurality of sprinklers 29 and a fire detector 30. It is understood that additional fire-safety mechanisms are installed within the structure enclosure 1 to enhance the safety within the structure enclosure 1. The plurality of sprinklers 29 dispense water within the structure enclosure 1 and preferably onto the area of the fire upon the detection of a fire. The fire detector 30 monitors the presence of a fire. In order to immediately manage a fire within the structure enclosure 1, the fire detector 30 and the plurality of sprinklers 29 are mounted within the structure enclosure 1. More specifically, the plurality of sprinklers 29 is distributed around the structure enclosure 1 and is operatively coupled with the fire detector 30, wherein the fire detector 30 is used to selectively activate the plurality of sprinklers 29 with a presence of fire in the structure enclosure 1. The fire detector 30 is managed by the user as the fire detector 30 is electronically connected with the main controller unit 31. The fire detector 30 is able to operate as the fire detector 30 is electrically connected with the power supply 32.

Figure 12:
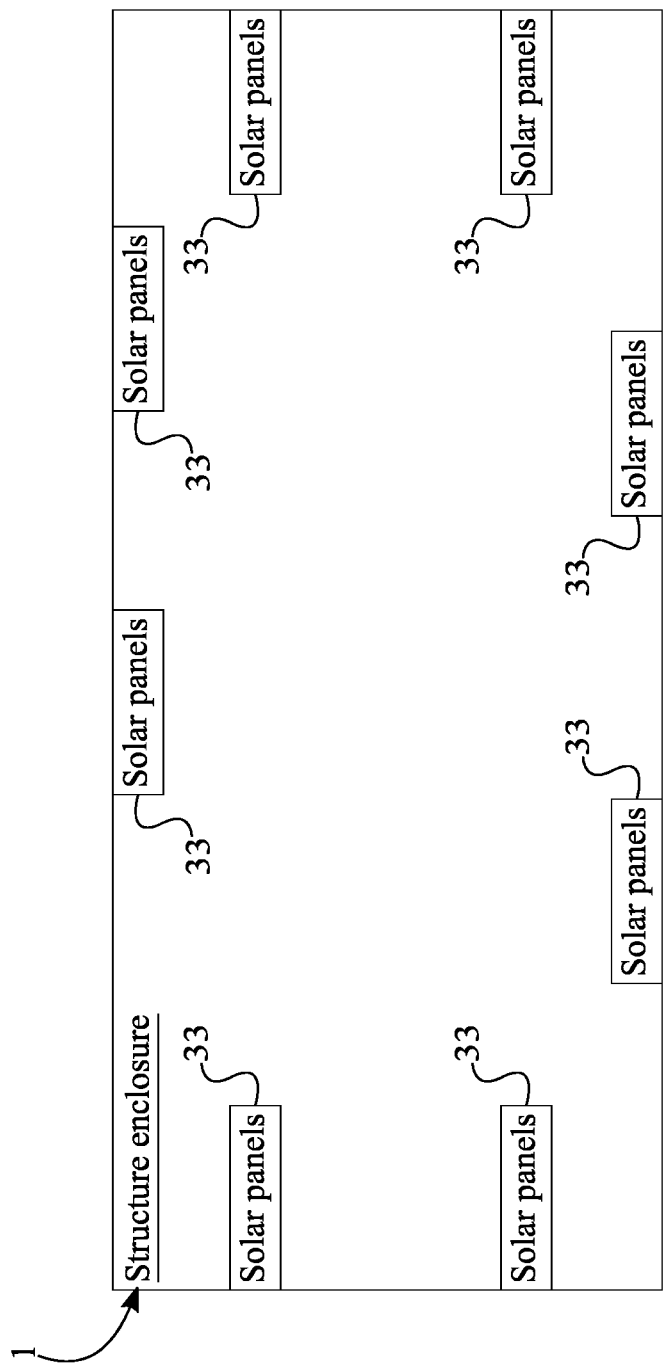
FIG. 12 is a schematic view for the positioning of a plurality of solar panels within that of the structure enclosure of the present invention.
Figure 13:
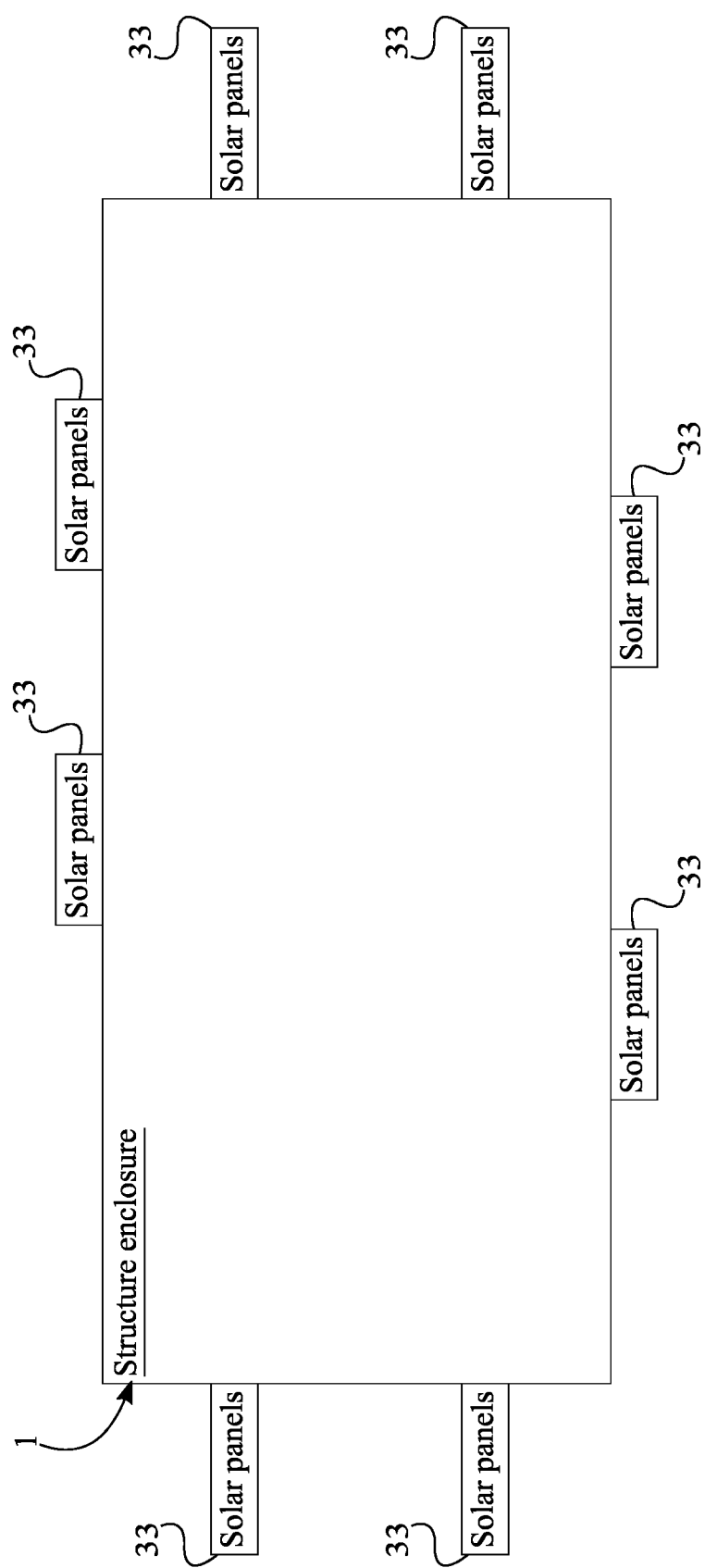
FIG. 13 is a schematic view for the positioning of a plurality of solar panels outside that of the structure enclosure of the present invention.

In the preferred embodiment of the present invention, the power supply 32 comprises a plurality of solar panels 33, seen in FIG. 12 and FIG. 13. The plurality of solar panels 33 takes advantage of the main structural layer 6, the inner layer 7, and the outer layer 8 being transparent. The plurality of solar panels 33 provides renewable energy as to minimize the ecological footprint of the present invention. In order to be able to maximize the power harnessed through solar energy, the plurality of solar panels 33 is mounted onto the structure enclosure 1 and is distributed around the structure enclosure 1. As seen in FIG. 12, the plurality of solar panels 33 is preferably positioned within the structure enclosure 1 to provide easy access to the plurality of solar panels 33 at any time the user desires. In alternate embodiment of the present invention, the plurality of solar panels 33 is externally positioned with the structure enclosure 1 in the event solar energy is maximized while positioned externally, as seen in FIG. 13.

Although the invention has been explained in relation to its preferred embodiment, it is to be understood that many other possible modifications and variations can be made without departing from the spirit and scope of the invention as hereinafter claimed.

What is claimed is:

1. A safety enclosure for building structures comprising:
a structure enclosure;
at least one entrance;
a plurality of anchoring posts;
a plurality of indoor environmental systems;
a plurality of indoor maintenance systems;
a main controller unit;
a power supply;
the structure enclosure comprising a main dome portion, at least one corridor portion, and a base cutout rim;
the at least one corridor portion being positioned adjacent with the main dome portion;
a lateral cutout rim of the at least one corridor portion being fixed along a lateral cutout rim of the main dome portion;
the base cutout rim being peripherally positioned about the main dome portion and the at least one corridor portion;
the base cutout rim being positioned perpendicular with the lateral cutout rim of the at least one corridor portion and the lateral cutout rim of the main dome portion;
the at least one entrance being integrated into the structure enclosure;
the plurality of anchoring posts being distributed along the base cutout rim;
the plurality of anchoring posts being connected adjacent with the base cutout rim;
the plurality of indoor environmental systems and the plurality of indoor maintenance systems being mounted within the structure enclosure;
the plurality of indoor environmental systems and the plurality of indoor maintenance systems being electronically connected with the main controller unit;
the plurality of indoor environmental systems, the plurality of indoor maintenance systems, and the main controller unit being electrically connected with the power supply;
the main dome portion and the at least one corridor portion each comprising a main structural layer, an inner layer, and an outer layer;
the main structural layer being superimposed across the inner layer;
the outer layer being superimposed across the main structural layer, opposite the inner layer;
the inner layer being fixed with the main structural layer;
the outer layer being removably attached with the main structural layer;
wherein the main structural layer, the inner layer, and the outer layer are transparent.

2. The safety enclosure for building structures as claimed in claim 1, wherein the outer layer is made of an ultraviolet protective material with an anti-reflective feature.

3. The safety enclosure for building structures as claimed in claim 1 comprising:
each of the plurality of anchoring posts comprising a base plate and a height-adjustable rod;
the height-adjustable rod comprising a first rod end and a second rod end;
the height-adjustable rod being positioned normal to the base plate;
the first rod end being fixed onto the base plate; and,
the second rod end being mounted into the base cutout rim.

4. The safety enclosure for building structures as claimed in claim 1 comprising:
the plurality of indoor environmental systems comprising a heating, ventilation, and air conditioning (HVAC) system, an air-quality monitoring system, and an odor removal system;
the HVAC system being operatively integrated through the structure enclosure, wherein the HVAC system is used to manage an internal climate of the structure enclosure;
the odor removal system being operatively integrated through the structure enclosure, wherein the odor removal system is used to filter an unwanted odor out of the structure enclosure; and,
the air-quality monitoring system being operatively mounted within the structure enclosure, wherein the air-quality monitor system is used to test and warn a breathability quality of air within the structure enclosure.

5. The safety enclosure for building structures as claimed in claim 1 comprising:
the plurality of indoor environmental systems comprising a shade system;
the shade system comprising at least one curtain, a curtain rod, and a motorized track;
the shade system being positioned within the structure enclosure;
the curtain rod being mounted about the structure enclosure;
the curtain rod being positioned offset from the base cutout rim;
the motorized track being mounted along the curtain rod;
the at least one curtain being operatively coupled along the curtain rod by the motorized track, wherein the motorized track is used to move the at least one curtain along the curtain rod;
the motorized track being electronically connected with the main controller unit; and,
the motorized track being electrically connected with the power supply.

6. The safety enclosure for building structures as claimed in claim 1 comprising:
a plumbing system;
the plurality of indoor maintenance systems comprising a graywater system;
the graywater system comprising at least one collection tank, a whitewater reservoir, and a treatment-and-sewer system;
the plumbing system being operatively integrated through the structure enclosure, wherein the plumbing system is used to selectively move water throughout the structure enclosure;
at least one outlet of the plumbing system being in fluid communication with the at least one collection tank;
the at least one collection tank being in fluid communication with the whitewater reservoir through the treatment-and-sewer system; and,
the whitewater reservoir being in fluid communication with the at least one inlet of the plumbing system.

7. The safety enclosure for building structures as claimed in claim 1 comprising:

the plurality of indoor maintenance systems comprising a fire-safety system;
the fire safety system comprising a plurality of sprinklers and a fire detector;
the fire detector and the plurality of sprinklers being mounted within the structure enclosure;
the plurality of sprinklers being distributed around the structure enclosure;
the plurality of sprinklers being operatively coupled with the fire detector, wherein the fire detector is used to selectively activate the plurality of sprinklers with a presence of fire in the structure enclosure;
the fire detector being electronically connected with the main controller unit; and,
the fire detector being electrically connected with the power supply.

8. The safety enclosure for building structures as claimed in claim 1 comprising:
the power supply comprising a plurality of solar panels;
the plurality of solar panels being mounted onto the structure enclosure; and,
the plurality of solar panels being distributed around the structure enclosure.

9. The safety enclosure for building structures as claimed in claim 8 comprising:
the plurality of solar panels being positioned within the structure enclosure.

10. The safety enclosure for building structures as claimed in claim 8 comprising:
the plurality of solar panels being externally positioned with the structure enclosure.

11. A safety enclosure for building structures comprising:
a structure enclosure;
at least one entrance;
a plurality of anchoring posts;
a plurality of indoor environmental systems;
a plurality of indoor maintenance systems;
a main controller unit;
a power supply;
the structure enclosure comprising a main dome portion, at least one corridor portion, and a base cutout rim;
the at least one corridor portion being positioned adjacent with the main dome portion;
the main dome portion and the at least one corridor portion each comprising a main structural layer, an inner layer, and an outer layer;
a lateral cutout rim of the at least one corridor portion being fixed along a lateral cutout rim of the main dome portion;
the base cutout rim being peripherally positioned about the main dome portion and the at least one corridor portion;
the base cutout rim being positioned perpendicular with the lateral cutout rim of the at least one corridor portion and the lateral cutout rim of the main dome portion;
the at least one entrance being integrated into the structure enclosure;
the plurality of anchoring posts being distributed along the base cutout rim;
the plurality of anchoring posts being connected adjacent with the base cutout rim;
the plurality of indoor environmental systems and the plurality of indoor maintenance systems being mounted within the structure enclosure;
the plurality of indoor environmental systems and the plurality of indoor maintenance systems being electronically connected with the main controller unit;
the plurality of indoor environmental systems, the plurality of indoor maintenance systems, and the main controller unit being electrically connected with the power supply;
the main structural layer being superimposed across the inner layer;
the outer layer being superimposed across the main structural layer, opposite the inner layer;
the inner layer being fixed with the main structural layer;
the outer layer being removably attached with the main structural layer;
the main structural layer, the inner layer, and the outer layer are transparent; and,
the outer layer is made of an ultraviolet protective material with an anti-reflective feature.

12. The safety enclosure for building structures as claimed in claim 11 comprising:
each of the plurality of anchoring posts comprising a base plate and a height-adjustable rod;
the height-adjustable rod comprising a first rod end and a second rod end;
the height-adjustable rod being positioned normal to the base plate;
the first rod end being fixed onto the base plate; and,
the second rod end being mounted into the base cutout rim.

13. The safety enclosure for building structures as claimed in claim 11 comprising:
the plurality of indoor environmental systems comprising a heating, ventilation, and air conditioning (HVAC) system, an air-quality monitoring system, an odor removal system, and a shade system;
the shade system comprising at least one curtain, a curtain rod, and a motorized track;
the HVAC system being operatively integrated through the structure enclosure, wherein the HVAC system is used to manage an internal climate of the structure enclosure;
the odor removal system being operatively integrated through the structure enclosure, wherein the odor removal system is used to filter an unwanted odor out of the structure enclosure;
the air-quality monitoring system being operatively mounted within the structure enclosure, wherein the air-quality monitor system is used to test and warn a breathability quality of air within the structure enclosure;
the shade system being positioned within the structure enclosure;
the curtain rod being mounted about the structure enclosure;
the curtain rod being positioned offset from the base cutout rim;
the motorized track being mounted along the curtain rod;
the at least one curtain being operatively coupled along the curtain rod by the motorized track, wherein the motorized track is used to move the at least one curtain along the curtain rod;
the motorized track being electronically connected with the main controller unit; and,
the motorized track being electrically connected with the power supply.

14. The safety enclosure for building structures as claimed in claim 11 comprising:
a plumbing system;
the plurality of indoor maintenance systems comprising a graywater system;

the graywater system comprising at least one collection tank, a whitewater reservoir, and a treatment-and-sewer system;

the plumbing system being operatively integrated through the structure enclosure, wherein the plumbing system is used to selectively move water throughout the structure enclosure;

at least one outlet of the plumbing system being in fluid communication with the at least one collection tank;

the at least one collection tank being in fluid communication with the whitewater reservoir through the treatment-and-sewer system; and, the whitewater reservoir being in fluid communication with the at least one inlet of the plumbing system.

15. The safety enclosure for building structures as claimed in claim 11 comprising:

the plurality of indoor maintenance systems comprising a fire-safety system;

the fire safety system comprising a plurality of sprinklers and a fire detector;

the fire detector and the plurality of sprinklers being mounted within the structure enclosure;

the plurality of sprinklers being distributed around the structure enclosure;

the plurality of sprinklers being operatively coupled with the fire detector, wherein the fire detector is used to selectively activate the plurality of sprinklers with a presence of fire in the structure enclosure;

the fire detector being electronically connected with the main controller unit; and, the fire detector being electrically connected with the power supply.

16. The safety enclosure for building structures as claimed in claim 11 comprising:

the power supply comprising a plurality of solar panels;

the plurality of solar panels being mounted onto the structure enclosure; and, the plurality of solar panels being distributed around the structure enclosure.

17. The safety enclosure for building structures as claimed in claim 16 comprising:

the plurality of solar panels being positioned within the structure enclosure.

18. The safety enclosure for building structures as claimed in claim 16 comprising:

the plurality of solar panels being externally positioned with the structure enclosure.

* * * * *